United States Patent [19]

Vidal et al.

[11] 4,338,343

[45] Jul. 6, 1982

[54] LIQUID ANTI-MICROBIAL TREATMENTS FOR STORAGE GRAIN WITH AMMONIUM BISULFITE AND A DISPROPORTIONATION PRODUCT THEREOF

[75] Inventors: Frederick D. Vidal, Englewood Cliffs; Anantharaman Jayaraman, Nutley, both of N.J.

[73] Assignee: Pennwalt Corporation, Philadelphia, Pa.

[21] Appl. No.: 163,413

[22] Filed: Jun. 26, 1980

Related U.S. Application Data

[60] Continuation-in-part of Ser. No. 156,501, Jun. 4, 1980, Pat. No. 4,309,451, and Ser. No. 38,739, May 14, 1979, abandoned, said Ser. No. 156,501, is a division of Ser. No. 50,162, Jun. 20, 1979, abandoned.

[51] Int. Cl.³ .......................... A23B 9/00; A23L 3/34
[52] U.S. Cl. ..................................... 426/331; 426/335; 426/532; 422/28; 424/164
[58] Field of Search ............... 426/321, 331, 335, 312, 426/319, 320, 532, 442, 618; 424/317, 161, 162, 164, 166, 175, 127, 149; 422/28

[56] References Cited

U.S. PATENT DOCUMENTS

| | | | |
|---|---|---|---|
| 1,222,830 | 4/1917 | Werner | 424/317 |
| 1,524,494 | 1/1925 | Warth | 424/162 |
| 1,777,044 | 9/1930 | Legendre | 426/319 |
| 2,132,786 | 10/1938 | Hockenyos | 424/162 |
| 2,735,775 | 2/1956 | Bronstein, Jr. et al. | 426/164 |
| 2,799,583 | 7/1957 | Harris | 426/321 |
| 2,912,793 | 11/1959 | Stone et al. | 424/162 |
| 3,404,987 | 10/1968 | Kooistra et al. | 426/9 |
| 3,928,577 | 12/1975 | Kochurova et al. | 426/335 |
| 3,962,475 | 6/1976 | Forest et al. | 426/331 |
| 4,083,999 | 4/1978 | Drury et al. | 424/317 |

OTHER PUBLICATIONS

Chemical Abstracts, vol. 66, 1967, Abstract No. 27779k.
Chemical Abstracts, vol. 87, No. 19, p. 451, Nov. 1977, Abst. No. 150449p.
Foods, vol. 72, p. 293, 1970, Abstract No. 2303m.
Thermodynamics, vol. 88, p. 427, 1976, Abst. No. 137947x.
Chemical Abstracts, vol. 76, p. 329, 1972, Abst. No. 50552w.
Air Pollution & Industrial Hygiene, vol. 75, p. 167, 1971, Abst. No. 100985s.
Chemical Abstracts, vol. 53, 1959, Columns 22770-22771.
Chertkov, B. A., *Zhur. Priklad. Khim.*, 32, pp. 1732-1742, 1959.
Catalysis, Kinetics, vol. 78, p. 309, 1973, Abst. No. 20686s.
Chemical Abstracts, vol. 83, p. 600, 1976, Abst. No. 187726v.
Mizoguchi, T. et al., *Bulletin of the Chemical Society of Japan*, vol. 49, No. 1, 1976, pp. 70-75.
Chertkov, B. A. et al.; *Soviet Chemical Industry*, vol. 49, No. 6, 1973, pp. 383-387.
Kirk-Othmer, *Encyclopedia of Chemical Technology*, 2nd ed., pp. 90-91.
M. Goehring, Ergebnisse and Probleme der Chemie der Schwefelstick stoffverbindungen, Akademie Verlag, Berlin, 1957, pp. 138-141.
Nickless (ed.), Inorganic Sulfur Chemistry, (1968), p. 377, pp. 515-517.

*Primary Examiner*—Thomas G. Wiseman
*Assistant Examiner*—Elizabeth J. Curtin
*Attorney, Agent, or Firm*—Woodcock, Washburn, Kurtz, Mackiewicz & Norris

[57] ABSTRACT

Materials are disclosed for treating moist grains to prevent the growth of microorganisms during storage. These materials comprise aqueous solutions of ammonium bisulfite ($NH_4HSO_3$) and at least one acidification compound for at least lowering the pH of the solution to between about 2.5 to 4.0, preferably 3.0. Preferred acidification compounds include acidic ammonium salts of inorganic acids, such as sulfuric or phosphoric acids, and of organic acids such as acetic, propionic or other short chain organic acids. Alternatively, the disclosed preservative materials comprise disproportionation products of ammonium bisulphite solutions, such as ammonium or alkaline mineral salts of metabisulfites, trithionates, thiosulphates, tetrathionates, dithionates and others. Natural and artificially disproportionated solutions of ammonium bisulfite are also disclosed as exhibiting surprising preservative actions. The disclosed preservative materials are applied as liquids in treatments at 1% by weight of the grain to be preserved. Grain treated in accordance with the present invention exhibits increased resistance to spoilage and excellent odor, flavor and color characteristics. Accordingly, excellent preservatives are disclosed for treating grains which remains suitable for subsequent human consumption.

5 Claims, No Drawings

LIQUID ANTI-MICROBIAL TREATMENTS FOR STORAGE GRAIN WITH AMMONIUM BISULFITE AND A DISPROPORTIONATION PRODUCT THEREOF

CROSS REFERENCE TO RELATED APPLICATIONS

The present application is a continuation-in-part of our prior co-pending patent application entitled "Liquid Anti-Microbial Treatment for Storage Grain", Ser. No. 156,501, filed June 4, 1980, now U.S. Pat. No. 4,309,451 which is a division of my prior copending application Ser. No. 050,162, filed June 20, 1079, now abandoned, which is a continuation-in-part of Ser. No. 38,739, May 14, 1979, now abandoned which applications are hereby incorporated by reference as if fully set forth herein.

The present application is also a continuation-in-part of our prior co-pending patent application entitled "Gaseous Antimicrobial Treatment of Storage Grains", Ser. No. 06/038,739, filed May 14, 1979, now abandoned which application is hereby incorporated by reference as if fully set forth herein.

The present application is also related to our co-pending patent application entitled "Gaseous Anti-Microbial Treatments of Storage Grain", Ser. No. 163,410, filed June 26, 1980, which application is also a continuation-in-part of the above mentioned applications.

BACKGROUND OF THE INVENTION

The present invention relates to the field of preservative treatments of grains during storage, and more particularly, to treatments applied to grains containing more than about 15% moisture, to prevent microbial spoilage which might otherwise result, as for example due to the growth of various fungi, molds, etc.

It is often advantageous to store grains such as corn, wheat, sorghum and the like after harvest and prior to their eventual conversion into products such as flour, molasses, etc. Unfortunately, without some form of treatment after harvest, most grain will spoil, particularly when stored in semi-closed conditions, such as grain storage bins, elevators, etc. After harvest, most grain contains approximately 20% to 25% moisture. This moisture content is sufficient to promote microbial growth, such as fungi and mold growth, which may very rapidly cause spoilage of the stored grain.

One treatment for preserving grain during storage which has achieved considerable success is the rapid drying of grain through the application of heat, such as hot air, which reduces the moisture content of that grain to below about 15%. At this moisture content, grain may be stored for extended periods of time while retaining suitable odor, flavor, and color characteristics. Unfortunately, this technique normally requires the consumption of substantial amounts of energy which is used to provide the heat necessary for quick drying of grain to be preserved in this manner. Accordingly, a substantial need has arisen for alternative preservative treatments which may be used either alone or in combination with ambient air drying techniques, to thereby provide an energy efficient method of treating grain for storage.

Another treatment for preserving grain which has achieved some commercial success is the use of propionic acid. This treatment normally entails the provision of less than 2%, usually about 1%, by weight of propionic acid to the grain to be treated. While this method is effective for inhibiting microbial growth, grain treated with these amounts of propionic acid has an objectionable taste and color, and therefore may not be sold for human consumption. Nonetheless, under E.P.A. regulations, grain containing not more than 2% propionic acid can be sold for animal fodder. It is estimated that propionic acid treatment is not used on more than about 1% of the grains stored in the United States.

It has also been suggested to treat grains during storage with various gases. According to one process, ammonia gas is slowly "trickled" through grain to be treated. Unfortunately, this treatment discolors the treated grain, producing a darkened product. Accordingly, grain treated with an ammonia gas trickle process is permitted only for animal consumption.

Another gas which has been suggested for use in preserving grains is sulfur dioxide. Not surprisingly, sulfur dioxide gas, while exhibiting preservative effects, may produce some odor and flavor problems in the treated grain. Additionally, treatments with sulfur dioxide gas are extremely corrosive on storage equipment, presumably as the result of sulfurous and sulfuric acids which are formed within the moist treatment environment.

The above described treatments, and other chemical materials, have been described in various publications as exhibiting preservative or pesticidal effects:

For various patents referring to the use of gases, such as ammonia gas or sulfur dioxide gas, please see U.S. Pat. No. 1,777,044 (Legendre) (Grain preserved through treatment with ammonia gas, sodium carbonate or alkaline-reacting gas by adjusting the hydrogen ion concentration of the adherent moisture to a point within the range pH 7–10.); U.S. Pat. No. 3,928,577 (Kochurova et al.) (vegetable food products, flower bulbs, plants, etc. preserved with tablets containing potassium metabisulfite, gelatin or starch, stearic acid and salts thereof which are described as replacing use of sulfur dioxide, potassium metabisulfite, sulfurous acid and sodium bisulfite prior art techniques); U.S. Pat. No. 1,524,494 (Warth) (sulfur dioxide or other gases such as hydrocyanic acid gas, carbonic acid gas, and chlorine disclosed as treatments for composition cork to destroy or prevent the development of mold spores, bacteria, fungus growths, yeasts, insect larvae, etc.); U.S. Pat. No. 2,132,786 (Hockenyos) (sulfur dioxide intermixed with carbon dioxide for use as fumigant for carpet beetles, moths, bedbugs, etc.); U.S. Pat. No. 2,912,793 (Stone et al.) (soil treatment to reduce nematode populations comprising injection of sulfur dioxide substantially below the surface of the soil followed by a soil pH adjustment by application of an alkaline fertilizer, such as anhydrous ammonia, calcium oxide, etc.).

Organic acids, such as decanoic, undecylenic, and acetic acids, have also been suggested in the literature as treatments for storage grains:

In U.S. Pat. No. 3,962,475 a method is disclosed for preserving high moisture content agricultural grains comprising treating grains with, (1) a composition consisting essentially of an organic food-grade acid or phosphoric acid, (2) a water soluble, noncorrosive, nontoxic, alkali or alkaline earth metal sulfate salt, and (3) a synthetic organic cationic or anionic surfactant for enhancing the penetration of said acid into said grains. In accordance with this disclosure, exemplary organic acids include propionic and acetic acids, while exemplary alkali or alkaline earth metal sulfate salts particularly include such sulfate salts as sodium and potassium sulfates.

In U.S. Pat. No. 3,404,987 (Kooistra et al.), a preserving agent, such as propionic acid, sorbic acid, benzoic acid (and its methyl- and ethyl esters) and a potentiating agent, typically an edible mineral salt, such as the phosphates, carbonates, chlorides, nitrates, sulfites, pyrophosphates and hydroxides of iron, manganese, zinc, tin and silver, are disclosed as being effective in inhibiting microbial growth in food systems. In this patent, the cooperative effect between the preserving agent and potentiating agent is described as exhibiting outstanding activity against microorganisms.

Another chemical which has been reported in the literature as exhibiting a preservative effect is ammonium bisulfite. In *Chemical Abstracts*, Vol. 87, No. 19, p. 451 (1977) preservation with 0.4% ammonium bisulfite ($NH_4HSO_3$) of oat-pea, corn, clover-timothy, or alfalfa silage containing 72-84.6% water was described as improving feed quality. Preservation was described as increasing the soluble sugar, nitrogen and lactic acid content of the feeds and of preventing butyric acid formation. Good results were also reported by mixing corn with straw (5:1, 67.3% moisture) and treating the mixture with 0.4% ammonium bisulfite. Similarly, in *Chemical Abstracts*, Vol. 66, No. 7, p. 2616 (1967) (Abstract 27779K) selected preservatives were tested to determine the pH of a 1% solution, acidity or buffer value, and the preserving properties of selected preservatives. The preserving capacity was determined by the degree of suppression of germination of moist grain, the growth of mold, the activities of oxidative-reductive, proteolytic, and amylolytic enzymes. Thiourea, ammonium bisulfite ($NH_4HSO_3$), a mixture of urea and $NH_4$ pyrosulfate, and ammonium bisulfate ($NH_4HSO_4$) were described as good preservatives which enriched green matter with nitrogen and sulfur. Other ammonia containing compounds were described as weak preservatives. Of these compounds, ammonium bisulfite, ammonium bisulfate, and ammonium chloride ($NH_4Cl$) were recommended for further study and industrial tests. Finally, in *Chemical Abstracts*, Vol. 72, No. 1 (1970), p. 203 (Abstract No. 2303m) various sulfur preparations were described as preserving green fodder. Among these, liquid sulfur dioxide, $NaHS_2O_3$ and an 80% solution of $NH_4SO_3$ were tested at given doses. Upon comparison with "conventional methods", strong decomposition of all soluble carbohydrates was inhibited, the latent phase of fermentation was prolonged, total traceable acidity was decreased, and the formation of volatile and non-volatile organic acids was suppressed. The resultant silage was considered to be superior to conventional silages in organoleptic properties, as well as in maintenance of its structure. Preservation with sulfur preparations was described as reducing the loss of nutritive substances by 50%.

It is known to commercially prepare ammonium bisulfite by bubbling ammonia and sulfur dioxide into water, forming an essentially 100% yield of pure ammonium bisulfite solution having a pH of about 5.5. Aqueous solutions of 47-50 weight percent of ammonium bisulfite are thus readily available. Upon extended storage, particularly when exposed to air, ammonium bisulfite is known to spontaneously undergo various "disproportionation" reactions. For various discussions of these disproportionation reactions, their kinetics, and the products which result therefrom, please refer to the following articles, each of which are hereby incorporated by reference:

Landrooth et al, Thermodynamics, Vol. 88, 1976, p. 427, "Thermodynamics of the reaction of ammonia and sulfur dioxide in the presence of water vapor";

Zelionkaite et al, Chemical Abstracts, Vol. 76, 1972, p. 329, "Decomposition of Ammonium hydrosulfite solutions under the action of thiosulfate";

Scargill, Air Pollution and Industrial Hygiene, Vol. 75, 1971, p. 167, "Dissociation constants of anhydrous ammonium sulfite and ammonium pyrosulfite prepared by gas phase reactions";

Chertkov, Chemical Abstracts, Vol. 53, 1959, Cols. 22770-22771, (citing Zhur. Priklad. Khim. 32, 1695-1707, 1959), "Kinetics of the autodecomposition of ammonium bisulfite-sulfite solutions";

Chertkov, Zhur. Priklad. Khim. 32, 1732-1742, 1959, "Kinetics of Spontaneous Decomposition of Ammonium Sulfite-Bi-sulfite Solutions";

Najbar et al, Catalyst, Kinetics, Vol. 78, 1973, p. 309, "Kinetics and stoichiometry of the heterophase reaction sulfur dioxide with ammonia";

Hisatsune, Chemical Abstracts, Vol. 83, 1976, p. 600, "Infrared spectroscopic study of the ammonia-sulfur dioxide-water solid state system";

Mizoguchi et al, Bulletin of the Chemical Society of Japan, Vol. 49(1), 1976, pp. 70-75, "The Chemical Behavior of Low Valence Sulfur Compounds. X[1]) Disproportionation of Thiosulfate, Trithionate, Tetrathionate and Sulfite under Acidic Conditions";

Chertkov et al, Soviet Chemical Industry (English Translation), Vol. 49(6), 1973, pp. 383-387, "Spontaneous Decomposition of Concentrated Ammonium Sulfite-Bisulfite Solutions";

Encyclopedia of Chemical Technology, Vol. 14, pp. 90-91, edited by Raymond E. Kirk and Donald F. Othmer, published by The Interscience Encyclopedia, Inc., New York, "Thionic Acids";

Goehring et al, Zeitschrift fuer anorganische und allgemeine Chemie, Vol. 263, 1950, pp. 138-144, "Ueber die Einwirkung von Schwefeldioxyd auf Ammoniak";

M. Goehring, Ergebnisse and Probleme der Chemie der Schwefelstickstoffverbindungen, Akademie Verlag, Berlin, 1957.

These "disproportionation" reactions apparently cause ammonium bisulfite to be oxidized and disproportionated into several other compounds, which contribute to a solution exhibiting a lowered pH. Analysis of ammonium bisulfite which had aged for several years indicated that up to 20-30% may have been converted to ammonium bisulfate, and minor amounts of thiosulfate, metabisulfite, dithionate, imidodisulfonate, and various polythionates. In addition to a lowered pH, a disproportionated solution of ammonium bisulfite exhibits a yellow-greenish color which is not exhibited by a "fresh" (undisproportionated) aqueous solution of ammonium bisulfite.

As seen from the above, while many efforts have been made to provide preservatives which are suitable for use in preserving grains, no chemical preservative has yet been found which provides an efficient, low cost method of preserving grains, while maintaining or enhancing the color, odor and flavor characteristics of those grains so that the treated grains remain suitable for human consumption.

SUMMARY OF THE INVENTION

Quite surprisingly, applicants have found that "aged", i.e., substantially "disproportionated", solutions of ammonium bisulfite are superior materials for use in preserving grains during storage. Disproportionated ammonium bisulfite solutions, that is, solutions containing ammonium bisulfite and effective amounts of ammonium bisulfite disproportionation products, which exhibit a pH of between 2.5 and 4.0, preferably below 3.5 and about 3.0, are better preservatives than aqueous solutions of ammonium bisulfite. Disproportionated ammonium bisulfite solutions do not adversely effect the color, taste or odor of grains treated therewith and thus produce preserved grains which are fit for human, as well as animal consumption.

In accordance with alternate embodiments of the present invention, "synthetic" preservatives are provided which consist essentially of ammonium bisulfite and effective amounts of at least one ammonium bisulfite disproportionation product. These "synthetic" preservatives are preferably adjusted in pH through the addition of an acid, or acidic ammonium salt of an acid, to achieve a pH of between 2.5 and 4.0, preferably about 3.0. In accordance with these embodiments, suitable disproportionation products include ammonium dithionates, trithionates, tetrathionates, bisulfates, metabisulfites, imidodisulfonates, and polythionates. Hexametaphosphates, such as sodium hexametaphosphate, may also be added to ammonium bisulfite solutions to obtain a suitable preservative. In these preservatives, the molar ratio of the ammonium bisulfite to its disproportionation product(s) should range from about 1:0.10 to about 1:1. In accordance with these embodiments of the present invention, sulfuric, hydrochloric or phosphoric acids are suitable inorganic acids for use in adjusting the pH of the preservative solutions. Propionic, acetic, and other organic acids having less than 10 carbon atoms, are suitable organic acids for use in adjusting the pH of these preservative solution(s). More particularly, pH adjustment through the addition of an acidic ammonium salt, such as mono-ammonium dipropionate and/or mono-ammonium diacetate, are believed to be effective. The resultant grain preservatives are effective and economical and do not exhibit deleterious color, odor or flavor effects on grains treated therewith.

Further alternate embodiments of the present invention provide "artificially disproportionated" ammonium bisulfite solutions wherein one or more physical treatments are applied to ammonium bisulfite solutions to produce artificially disproportionated solutions exhibiting enhanced grain preservative actions. In accordance with these methods, ammonium bisulfite solutions are subjected to one or more steps of UV-irradiation, ultrasonication, or heating, to artificially disproportionate these ammonium bisulfite solutions to produce additional novel preservatives.

Still further alternate embodiments of the present invention provide acidified ammonium bisulfite solutions which have been found to be more active as grain preservatives than aqueous ammonium bisulfite solutions of higher alkalinities. In accordance with these embodiments of the present invention, acidic ammonium salts of an inorganic or organic acid are preferred to achieve a pH of between about 2.5 and 4.0, preferably less than 3.5 and about 3.0, in the acidified ammonium bisulfite solution. Sulfuric, hydrochloric or phosphoric acids are also suitable for use in adjusting the pH of the preservative solutions, as are propionic, acetic, benzoic, sorbic and other organic acids having less than 10 carbon atoms. Preferred acidic ammonium salts include mono-ammonium dipropionate and/or mono-ammonium diacetate. The resultant solutions provide grain preservatives which are effective, economical and do not impair the odor, color or flavor characteristics of the grains treated therewith.

Through the above methods, novel preservative materials are provided which prolong grain storage times to up to ten times the length obtained through corresponding aqueous ammonium bisulfite treatments.

Accordingly, a primary object of the present invention is the provision of novel grain preservatives.

Another object of the present invention is the provision of grain preservatives which do not adversely affect the color, taste or odor of the grains treated therewith.

A further object of the present invention is the provision of grain preservatives which produce preserved grain suitable for human consumption.

A further object of the present invention is the provision of a peanut preservative which controls at least *A. flavus*, and thus, levels of aflatoxin.

These and other objects of the present invention will become apparent from the following more detailed description.

DESCRIPTION OF THE PREFERRED EMBODIMENTS

While particular examples have been selected for the purposes of illustration, one of ordinary skill in the art will recognize from the information set forth herein that the materials and methods of the present invention are applicable to a wide variety of grains in a wide variety of treatment concentrations. Accordingly, one of ordinary skill in the art will recognize that various modifications may be made to the specific materials and concentrations described hereinafter without departing from the scope of the present invention, which is defined more particularly in the appended claims.

In testing the materials and methods of the present invention, various methods were employed to determine the effectiveness of control and test compositions upon samples of moist wheat, corn, and sorghum. As an experimental technique, it has been found desirable to conduct comparative tests on wheat and sorghum utilizing sterilized and subsequently innoculated grain samples. Unless otherwise specified hereinafter, all wheat and sorghum samples have been inoculated with spores of *A. flavus* in concentrations of $10^8$ spores per gram of grain. This procedure enables rapid testing of various preservative substances and produces reliable results due to the fact that *A. flavus* is recognized to be a major source of spoilage which is extremely difficult to control. Further, particularly in peanuts, by controlling *A. flavus* populations, concentrations of aflatoxin may correspondingly be controlled.

It is within the scope of the present invention to apply the disclosed preservative solutions in weight percentages ranging from 0.05 to 5 weight percent, preferably 0.5 to 1.5 weight percent, or about 1 weight percent of the grain to be treated. Similarly, it is within the scope of this invention to utilize aqueous solutions containing between 5 and 60 weight-percent, preferably 20 and 50 weight-percent ammonium bisulfite. Those of ordinary skill in this art will recognize that, due to the ionic nature of the disclosed perservative solutions, other materials, such as sodium and potassium salts, which are ionic in solution, may be added to achieve the chemical equivalence of these weight percentages of ammonium bisulfite. In the following examples, treatments with the indicated test solutions were applied at 1% by weight of the grain to be treated, unless otherwise indicated. Any required adjustment of pH has been accomplished through additions of ammonium bisulfate to the test solutions, unless otherwise indicated. As seen from the following table, test materials in accordance with the various above described embodiments exhibit marked preservative effects on the moist (i.e. 25% $H_2O$) test grain samples.

TABLE I

| Example | Treatments* | | Grain | pH | Effective Period In Days |
|---|---|---|---|---|---|
| 1 | 47% $NH_4HSO_3$ | | Wheat | 5.0 | 2 |
| 2 | 46.8% $NH_4HSO_3$ | | Wheat | 4.5 | 2 |
| 3 | 46% $NH_4HSO_3$ | pH adjusted with solid $NH_4HSO_4$ | Wheat | 4.0 | 4 |
| 4 | 45% $NH_4HSO_3$ | | Wheat | 3.5 | 8 |
| 5 | 44% $NH_4HSO_3$ | | Wheat | 2.9 | 14 |
| 6 | 5% $NH_4HSO_4$; | pH adjusted with 40% NaOH | Wheat & Sorghum | 3.0 | 2 |
| 7 | 4N $H_2SO_4$ | | Wheat & Sorghum | 3.0 | 2 |
| 8 | 4N HCl | | Wheat & Sorghum | 3.0 | 2 |
| 9 | 4N $H_3PO_4$ | | Wheat & Sorghum | 3.0 | 2 |
| 10 | 40% $NaHSO_3$; | pH adjusted with solid $NH_4HSO_4$ | Wheat & Sorghum | 3.0 | 8 |
| 11 | 6% $H_2SO_3$; | pH adjusted with 40% NaOH | Wheat | 3.0 | 3 |
| 12 | 1% $Na_2S_2O_6$ | | Sorghum | 3.0 | 1 |
| 13 | 1% $Na_2S_3O_6$; | pH adjusted with solid $NH_4HSO_4$ | Sorghum | 3.0 | 1 |
| 14 | 1% $K_2S_5O_6$; | pH adjusted with solid $NH_4HSO_4$ | Sorghum | 3.0 | 1 |
| 15 | 1% $K_2S_6O_6$; | pH adjusted with solid $NH_4HSO_4$ | Sorghum | 3.0 | 1 |
| 16 | 10% $K_2S_3O_6$ | | Wheat | 3.4 | 1 |
| 17** | 40% $K_2S_2O_5$; | pH adjusted with solid $NH_4HSO_4$ | Wheat | 3.0 | 12 |
| 18 | 10% $K_2S_3O_6$; | pH adjusted with $NH_4HSO_4$ | Wheat | 3.0 | 1 |
| 19 | 10% $Na_2S_4O_6$; | pH adjusted with $NH_4HSO_4$ | Wheat | 3.0 | 2 |
| 20 | 2% $Na_2S_2O_6$ + 2% $K_2S_3O_6$ + 2% $Na_2S_4O_6$ + 2% $(NH_4)_2S_2O_3$; pH adjusted with solid $NH_4HSO_4$ | | Wheat | 3.0 | 7 |

*All treatments are 1 g per 100 g of the grain
**Metabisulfites are known preservative agents From Table I it may be seen that the aqueous ammonium bisulfite solutions adjusted to within a pH range of between 2.5 and 3.5, are effective grain preservatives. Examples 1–5 of Table I clearly demonstrate the effects of acidified ammonium bisulfite solutions applied to wheat. Examples 1 and 2 indicate that a "fresh" or a slightly acidified ammonium bisulfite solution is not particularly effective as a wheat preservative when applied at 1% by weight. An improvement in preservative effect is exhibited by Example 3, wherein the pH of an ammonium bisulfite solution has been adjusted to 4.0. A further improvement in preservative effect is exhibited by Examples 4 and 5, which have been adjusted in pH to 3.5 and 2.9 respectively. Accordingly, when ammonium bisulfite solutions are adjusted to within the preferred pH range, preservation periods are prolonged to between 4 and 7 times the preservative periods exhibited by regular ammonium bisulfite solutions of higher alkalinity. Examples 6–9 and 11–20 are provided for comparative purposes. As seen from Table I, these additional materials, even though in many instances including ammonium ions and having been similarly adjusted to preservative properties. Example 20 includes several disproportionation product equivalents which, in absence of ammonium bisulfite, show only moderate acitivity.

The general antimicrobial effects of test substances on a wide range of bacteria, fungi, and molds which are likely to develop in unpreserved grains has also been investigated. In particular, preservative materials in accordance with the present invention have been found to be effective against bacteria, yeasts and molds such as aspergillus, penicillium, alternaria and fusarium. Indeed, no fungi believed to contribute to natural grain spoilage has yet been found which is not effectively controlled through the use of the herein disclosed treatments.

In the following examples, 20 grams of wheat were adjusted to have a moisture content of 25% and sterilized. These samples were then inoculated with $10^8$ spores of A. flavus per gram of wheat. After four days of incubation at room temperature, the infected samples were subjected to various treatments at 1% by weight of the grain. In Table II, the treatments and the minimum periods for which such treatments were deemed effective in preventing spoilage are indicated.

TABLE II

| Example | Treatment* | pH | Effective Period (in Weeks) |
|---|---|---|---|
| 21 | 47% $NH_4HSO_3$ "old" ammonium bisulfite (stored at ambient temperature for several years) | 3.0 | >60 |
| 22 | 100% Propionic Acid | — | >60 |
| 23 | 20% Propionic Acid | — | 2 |
| 24 | 47% $NH_4HSO_3$ (Fresh) | 5.3 | <1 Moldy |
| 25 | 45% $NH_4HSO_3$ (Fresh) + 4.8% $NH_4HSO_4$ | 3.0 | 2 Moldy |
| 26 | 39% $NH_4HSO_3$ (Fresh) + 17% Propionic Acid | 3.0 | >60 |
| 27 | 29% $NH_4HSO_3$ (Fresh) + 31% $Na_2S_2O_5$ | 3.0 | >60 |
| 28 | 31% $NH_4HSO_3$ (Fresh) + 33% $Na_2S_2O_5$ | 5.3 | 6 Moldy |
| 29 | 45% $NH_4HSO_3$ stored at ambient temperature for several months. Heated at 55° C. for 2 days. | 3.0 | >50 |
| 30 | 41% $NH_4HSO_3$ (Fresh) + 9% $K_2S_3O_6$ | 3.0 | >41 |
| 31 | 28% $NH_4HSO_3$ (Fresh) + 6% $K_2S_3O_6$ + 29% $(NH_4)_2S_2O_3$ | 3.0 | >41 |
| 32 | 42% $NH_4HSO_3$ (Fresh) + 11% 6N $H_2SO_4$ | 3.0 | >55 |
| 33 | 45% $NH_4HSO_3$ (Fresh) irradiated with UV light for 24 hours | 3.0 | 12 Moldy |
| 34 | 45% $NH_4HSO_3$ subjected to ultrasonication | 3.0 | 8 Moldy |
| 35 | 46% $NH_4HSO_3$ (Fresh) + 1% thiodipropionic acid | 3.0 | 9 Moldy |
| 36 | 46% $NH_4HSO_3$ (Fresh) + 1% benzoic acid | 3.0 | 9 Moldy |
| 37 | 46% $NH_4HSO_3$ (Fresh) + 1% sorbic acid | 3.0 | 9 Moldy |
| 38 | 39% $NH_4HSO_3$ (Fresh) + 8% acetic acid + 8% propionic acid | 3.0 | >55 |
| 39 | 39% $NH_4HSO_3$ (Fresh) + 4% $K_2S_3O_6$ + 4% $Na_2S_4O_6$ | 3.0 | >55 |
| 40 | 43% $NH_4HSO_3$ (Fresh) + 4.5% $K_2S_3O_6$ + 4.5% $Na_2S_4O_6$ | 4.9 | 4 Moldy |
| 41 | 39% $NH_4HSO_3$ (Fresh) + 8% $Na_2S_2O_6$ | 3.0 | 2 Moldy |
| 42 | 40% $NH_4HSO_3$ (Fresh) + 1.7% $Na_2S_2O_6$ + 1.7% $K_2S_3O_6$ + 1.7% $Na_2S_4O_6$ + 1.7% $(NH_4)_2S_2O_3$ | 3.0 | >38 |
| 43 | 42% $NH_4HSO_3$ (Fresh) + 1% ammonium polysulfide | 3.0 | 3 Moldy |
| 44 | 21% $NH_4HSO_3$ (Fresh) + 6% 1 M ammonium diacetate | 3.0 | 2 Moldy |
| 45 | 20% $NH_4HSO_3$ (Fresh) + 7% 1 M | 3.0 | 3 Moldy |

TABLE II-continued

| Example | Treatment* | pH | Effective Period (in Weeks) |
|---|---|---|---|
| | ammonium dipropionate | | |

*The treatment solutions for the different examples contained also varying amounts of water to obtain a total of 100%.

As seen from Table II representatives of each of the preferred embodiments of the present invention are set forth. With respect to the use of disproportionated (old) ammonium bisulfite solutions as preservatives, compare Example 21 to Example 24, whereupon it will be seen that naturally disproportionated ammonium bisulfite extends the effective preservative period by more than 60 times. Similarly, representative mixtures of ammonium bisulfite and at least one additional ammonium bisulfite disproportionation product (or its equivalent potassium or sodium salt) exhibited various improvements in the effective preservation periods for the treated samples (see Examples 27, 28, 30, 31, 39, 40, 41, and 42). In each instance, ammonium bisulfite and an effective amount of one or more of its disproportionation products, particularly when adjusted in pH to be within a preferred range of 2.5 to 3.5, exhibited at least twice the preservative effect of a fresh (un-disproportionated) ammonium bisulfite solution (Example 24).

In Table II artificially "disproportionated" ammonium bisulfite solutions are also represented which are seen to have preservative effects which are enhanced over those of fresh (undisproportionated) ammonium bisulfite solutions. The artificial techniques employed to accelerate disproportionation reactions include storage plus heat (Example 29), ultraviolet irradiation (Example 33), and ultrasonication (Example 34). In accordance with the methods of the present invention, heating should be conducted at between 35° C. and 100° C., preferably 45° C. to 60° C. for at least about 8 hours, preferably 2 days or more. Ultrasonication should be conducted for at least 15 minutes, at cps of 18–20 kHz, preferably 20 kHz. Irradiation should be conducted using a UV light source for at least 15 minutes, and preferably 24 hrs. or more, at 50-200 Joules/sec/m$^2$.

As seen in Table II, representative acidified ammonium bisulfite solutions continue to show enhanced preservative effects when compared to ammonium bisulfite solutions having higher alkalinities. Examples 25, 26, 32, 35, 36–38, and 43–45 clearly indicate that the antimicrobial properties of aqueous solutions of ammonium bisulfite may be enhanced through additions of indicated materials.

The novel preservatives of the present invention were also tested as preservatives for yellow corn and sorghum. In these tests, the moisture content of un-inoculated 1 kg samples of yellow corn, and sorghum were adjusted to 25% and incubated at room temperature for four days to increase initial microbial loads. These samples were then sprayed with various aqueous solutions as indicated in Table III at 1% by weight of the grain and stored in brown bottles with the caps placed loosely thereon to simulate a partially closed system. The initial microbial load was about 10$^8$ organisms per gram of the grain. Propionic acid treated grain was considered as a control to compare the efficacies of the treatments. The treated samples were analyzed at various time intervals for their microbial loads by the Total Plate Count Method to determine the effective periods. The results are set forth in Examples 46 through 71 in Table III.

TABLE III

Treatments of Yellow Corn

| Example | Treatments | pH | Effective Period (in Weeks) |
|---|---|---|---|
| 46 | 47% NH$_4$HSO$_3$ stored at ambient temperature for several years | 3.0 | 19 |
| 47 | 45% NH$_4$HSO$_3$ (Fresh) | 3.0 | 2 |
| 48 | 47% NH$_4$HSO$_3$ (Fresh) | 5.3 | 1 |
| 49(a) | 42% NH$_4$HSO$_3$ + 11% H$_2$SO$_4$(4N) Corn | 3.0 | 2 |
| 49(b) | 42% NH$_4$HSO$_3$ + 11% HCl (4N) Corn | 3.0 | 2 |
| 49(c) | 42% NH$_4$HSO$_3$ + 11% H$_3$PO$_4$ (4N) Corn | 3.0 | 2 |
| 50 | 45% NH$_4$HSO$_3$ (Fresh) heated 2 days at 50° C. | 3.0 | 23 |
| 51 | 100% Propionic Acid | — | 40 |
| 52 | 41% NH$_4$HSO$_3$ (Fresh) + 9% K$_2$S$_3$O$_6$ | 3.0 | 5 |
| 53 | 44% NH$_4$HSO$_3$ (Fresh) + 4.7% 1,2-Propanediol + 1.9% undecylenic acid | 5.5 | 20 |
| 54 | 46% NH$_4$HSO$_3$ (Fresh) + 1% ammonium polysulfide | 4.3 | 15 |
| 55 | 29% NH$_4$HSO$_3$ (Fresh) + 31% (NH$_4$)$_2$S$_2$O$_3$ | 3.0 | 15 |
| 56 | 45% NH$_4$HSO$_3$ (Fresh) + irradiated with UV light for 24 hours | 3.0 | 6 |
| 57 | 45% NH$_4$HSO$_3$ (Fresh) ultrasonicated | 3.0 | 6 |
| 58 | 45% NH$_4$HSO$_3$ (Fresh) used at 1.5% by weight of grain sample | 3.0 | 15 |
| 59 | 45% Na$_2$S$_2$O$_5$ | 3.0 | 5 |
| 60 | 29% NH$_4$HSO$_3$ (Fresh) + 31% Na$_2$S$_2$O$_5$ | 3.0 | 30 |
| 61 | 39% NH$_4$HSO$_3$ (Fresh) + 17% propionic acid | 3.0 | 30 |
| 62 | 28% NH$_4$HSO$_3$ (Fresh) + 29% (NH$_4$)$_2$S$_2$O$_3$ + 6% K$_2$S$_3$O$_6$ | 3.0 | 11 |
| | Temperatures | | |
| 63 | 39% NH$_4$HSO$_3$ (Fresh) + 8% sodium hexametaphosphate | 3.0 | 9 |
| 64 | 31% NH$_4$HSO$_3$ (Fresh) + 33% (NH$_4$)$_2$S$_2$O$_3$ & SO$_2$ bubbled thru till the pH reached 3.0 | 3.0 | 17 |
| 65 | 39% NH$_4$HSO$_3$ (Fresh) + 8% diammonium imidodisulfonate | 3.0 | 9 |
| 66 | 39% NH$_4$HSO$_3$ (Fresh) + 8% K$_2$S$_3$O$_6$ | 3.0 | 9 |

Treatments of Sorghum

| Example | Treatments | pH | Effective Period (in Weeks) |
|---|---|---|---|
| 67 | 100% Propionic Acid | — | 28 |
| 68 | 45% NH$_4$HSO$_3$ (Fresh) | 3.0 | 9 |
| 69 | 39% NH$_4$HSO$_3$ (Fresh) + 8% sodium hexametaphosphate | 3.0 | 24 |
| 70 | 47% NH$_4$HSO$_3$ stored at ambient temperature for several months | 3.0 | 15 |
| 71 | 29% NH$_4$HSO$_3$ (Fresh) + 31% (NH$_4$)$_2$S$_2$O$_3$ | 3.0 | 7 |

Once again, the test substances indicated in Table III are representative of the various embodiments of the present invention. Substantially disproportionated ammonium bisulfite, that is, an ammonium bisulfite which has aged until its pH has dropped below 4.0, and preferably below 3.5 to about 3.0, is substantially more effective than a corresponding fresh ammonium bisulfite solution (compare Example 46 with Example 48). Similarly, as compared against a fresh ammonium bisulfite solution (Example 48), ammonium bisulfite solutions additionally comprising at least one disproportionation product (or its alkaline metal equivalent) showed substantial improvements in the effective periods in preserving both corn and sorghum. See Examples 52, 55, 60, 62, 64, 65, 66, and 71. Similarly, acidified ammonium bisulfite solutions evidenced an increased effective period when compared to fresh ammonium bisulfite. See Examples 47, 49a, 49b, 49c, 53, 54, 61, 63, and 69. Artificially disproportionated ammonium bisulfite solutions exhibited characteristic increases in effective preservative periods for corn and sorghum. See example 50 (heated two days at 50° C.), 56 (irradiated with UV light for 24 hours), 57 (ultrasonicated), and 70 (several months storage at ambient temperature).

In order to investigate the effect of varying initial microbial loads on the effectiveness of acidified ammonium bisulfite materials, the moisture content of samples of white corn was ajusted to 25% and incubated at room temperature for varying periods of time to achieve preselected initial microbial loads. The samples were then sprayed with various treatments at 1% by weight of the grain and stored at room temperature in cylindrical glass jars with 24 square inches of open top surface to simulate an open system. The treated samples were analyzed periodically for their microbial loads. In Table IV, the effectiveness of ammonium bisulfite solutions acidified with various acids and methylene-bis-propionate (Examples 73–75) compare favorably to treatments of 100% propionic acid (Example 72), regardless of the tested initial microbial load. (Methylene-bis-propionate is a known antimicrobial substance.)

TABLE IV

Treatments of White Corn with Various Initial Microbial Loads

| Example | Treatment | pH | Effective Period in Weeks When the Initial Microbial Load is | | | |
|---|---|---|---|---|---|---|
| | | | $2 \times 10^5$/g | $4 \times 10^7$/g | $1.8 \times 10^8$/g | $3.8 \times 10^8$/g |
| 72 | 100% Propionic acid | — | 14 | 14 | 14 | 14 |
| 73 | 39% $NH_4HSO_3$ (Fresh) + 17% propionic acid | 3.0 | 14 | 14 | 14 | 14 |
| 74 | 34% $NH_4HSO_3$ (Fresh) + 14% acetic acid + 14% propionic acid + 5 mg selenium metal per 100 ml solution | 3.0 | 14 | 14 | 14 | 14 |
| 75 | 39% $NH_4HSO_3$ (Fresh) + 17% methylene-bis-propionate | 3.0 | 14 | 14 | 14 | 14 |

During the above-described tests, the preservative treatments of the present invention were noted as apparently not imparting the adverse color, odor, or flavor characteristics to grains treated with the herein disclosed inventive materials. Accordingly, a taste panel was assembled of untrained judges who were presented with coded samples of corn. These judges were asked to rank the color, odor, and taste of the samples on a scale of 1–10, with 1 being the best. Odor and taste were evaluated on cooked samples. The following table provides the average rankings of the judges resulting from this test:

TABLE V

| Treatments | Color | Odor | Taste |
|---|---|---|---|
| Control | 5.5 | 5.0 | 4.0 |
| Propionic acid | 8.8 | 8.4 | 8.5 |
| $SO_2$ | 3.5 | 4.6 | 4.4 |
| $NH_4HSO_3$ | 3.2 | 3.2 | 4.2 |
| $NH_4HSO_3$ + $Na_2S_2O_5$ | 3.4 | 3.6 | 5.0 |

TABLE V-continued

| Treatments | Color | Odor | Taste |
|---|---|---|---|
| $NH_4HSO_3$ + propionic acid | 4.7 | 5.2 | 4.6 |

From the above Table it may be concluded that propionic acid exhibits the worst color, odor, and flavor of any of the samples tested. The other samples tested do not differ substantially from the control. Although ammonia gas treated samples were not presented to the test panel, corn which was treated with ammonia gas looked greenish brown and had a slight bitter taste.

Treatments of 1% by weight of a solution of 39% ammonium bisulfite and 17% propionic acid have also been compared to similar 100% propionic acid treatments to determine their apparent corrosiveness. The corrosiveness of the given treatments were compared by determining the percent change in the weights of metal pieces buried in the corn subject to these treatments. Propionic acid was found to exhibit a 0.31% corrosion, while a solution of 39% ammonium bisulfite and 17% propionic acid was found to have a percent corrosion of 0.24%. This improvement in corrosiveness is believed to be of substantial commercial significance.

Since aged ammonium bisulfite solutions were observed to have an altered yellow-green color, experiments were conducted to characterize the colors of various ammonium bisulfite solutions, including ammonium bisulfite solutions which have been aged, physically disproportionated, or acidified in accordance with various embodiments of the present invention. It was found that by measuring the absorption of ammonium bisulfite solutions at 770 m$\mu$, substantial differences in percent transmittance (%T) and optical density (O.D.) were observed. These results are provided in Table VI.

TABLE VI

Measurement of Absorption of $NH_4HSO_3$ Solutions at 770 m$\mu$

| | % Solid $NH_4HSO_3$ needed to reach indicated pH** | pH | % T | O.D. |
|---|---|---|---|---|
| 45–48% Fresh $NH_4HSO_3$ | — | 5.3 | 32 | 0.5 |
| 45–48% Fresh $NH_4HSO_3$ | 2.6 | 5.0 | 28 | 0.56 |
| 45–48% Fresh $NH_4HSO_3$ | 5.7 | 4.5 | 22 | 0.66 |
| 45–48% Fresh $NH_4HSO_3$ | 7.2 | 4.0 | 14 | 0.86 |
| 45–48% Fresh $NH_4HSO_3$ | 8.2 | 3.5 | 28* | 0.55* |
| 45–48% Fresh $NH_4HSO_3$ | 10.9 | 3.0 | 23* | 0.63* |
| 45–48% Fresh $NH_4HSO_3$ | 18.0 | 2.5 | 22* | 0.65* |
| Several Month Old $NH_4HSO_3$ - Sample I | | 3.7 | 13 | 0.88 |
| Several Month Old $NH_4HSO_3$ - Sample II | | 3.5 | 28* | 0.55* |
| $NH_4HSO_3$, heated at 55° C. for 24 hours | | 3.0 | 23* | 0.63* |
| $NH_4HSO_3$, sonified 15 min. at 20 kHz | | 4.9 | 31 | 0.52 |
| $NH_4HSO_3$, U.V. irradiated 50–200 Joules/sec/m² for 30 min. | | 3.0 | 23* | 0.63 |

*Measured on 2 times diluted solutions
**Percentages may vary depending upon condition and source of ammonium bisulfite solution As seen from Table VI, the percent transmission at the specified wavelength drops substantially as solid ammonium bisulfate is added to solutions of aqueous ammonium bisulfite. As the pH of the test solutions dropped below 4.0, it was necessary to dilute the solutions in order to obtain readable results. From Table VI, it will be seen that measurement of absorptions at the specified wavelength may be useful in predicting the effectiveness of a given ammonium bisulfite solution.

The treatments and methods of the present invention have also been found effective for preserving peanuts, particularly to control *Aspergillus flavus* growth, and thus to reduce aflatoxin concentrations therein. These preservatives are also believed useful for treating moist sunflower seeds to preserve these seeds during storage.

As seen from the above, a number of novel preservatives have been described which are clearly superior to those heretofore known to the art. The subject preservative solutions may be applied in relatively low weight percentages to produce products which are fit for human consumption. When tested with closed, semi-closed and open storage systems, the materials of the present invention demonstrate preservative properties which enable the subject grains to be stored for substantial lengths of time. The preservatives of the present invention are believed particularly suited for use in open systems. In such systems, ambient air drying may reduce the moisture content of the subject grains to below about 15% moisture during the effective period of preservation. In this manner, grains treated with the novel materials of the present invention may be stored virtually indefinitely while retaining the properties necessary to permit human consumption.

What is claimed is:
1. A method of preserving moist grain to prevent spoilage thereof, comprising the steps of:
   (a) providing an aqueous ammonium bisulfite solution;
   (b) adding to said solution an amount of at least one ammonium bisulfite disproportionation product effective to improve the antimicrobial effect of said solution, to provide a preservative solution; and
   (c) applying said preservative solution to said grain in amounts effective to prevent spoilage of grain.
2. A method in accordance with claim 1 wherein said ammonium bisulfite disproportionation product is ammonium bisulfate.
3. The method of claim 1 wherein said disproportionation product is selected from the group consisting of alkaline salts of, dithionates, trithionates, tetrathionates, pentathionates, hexathionates, imidodisulfonates, bisulphates, metabisulfites, and sulfides.
4. The method of claim 1 wherein the molar ratio of ammonium bisulfite to said disproportionation product is from about 1:0.10 to 1:1.
5. The method of claim 1 wherein said disproportionation product is a thiosulphate.

* * * * *